(12) United States Patent
Hüffner et al.

(10) Patent No.: US 12,265,563 B2
(45) Date of Patent: Apr. 1, 2025

(54) SYSTEM AND METHOD FOR QUERYING OF UNSTRUCTURED TEXT USING GRAPH ANALYSIS

(71) Applicant: THETA LAKE, INC., Santa Barbara, CA (US)

(72) Inventors: Sharon Hüffner, Berlin (DE); Rohit Jain, Ventura, CA (US); Devin H. Redmond, Encinitas, CA (US); Richard B. Sutton, San Mateo, CA (US)

(73) Assignee: THETA LAKE, INC., Santa Barbara, CA (US)

( * ) Notice: Subject to any disclaimer, the term of this patent is extended or adjusted under 35 U.S.C. 154(b) by 449 days.

(21) Appl. No.: 17/570,878

(22) Filed: Jan. 7, 2022

(65) Prior Publication Data
US 2022/0215046 A1 Jul. 7, 2022

Related U.S. Application Data

(60) Provisional application No. 63/134,669, filed on Jan. 7, 2021.

(51) Int. Cl.
| | |
|---|---|
| *G06F 16/00* | (2019.01) |
| *G06F 16/2457* | (2019.01) |
| *G06F 16/334* | (2025.01) |
| *G06F 16/353* | (2025.01) |
| *G06F 16/901* | (2019.01) |

(52) U.S. Cl.
CPC ...... *G06F 16/334* (2019.01); *G06F 16/24575* (2019.01); *G06F 16/353* (2019.01); *G06F 16/9024* (2019.01)

(58) Field of Classification Search
CPC .. G06F 16/334; G06F 16/9024; G06F 16/353; G06F 16/24575
USPC .................................................. 707/771, 751
See application file for complete search history.

(56) References Cited

U.S. PATENT DOCUMENTS

2013/0124538 A1* 5/2013 Lee ................... G06F 16/24575
707/751
2021/0200877 A1* 7/2021 Salo ........................ G06F 16/36

* cited by examiner

*Primary Examiner* — Chelcie L Daye
(74) *Attorney, Agent, or Firm* — Sprinkle IP Law Group (57) ABSTRACT

Systems and methods for enhanced rule-based querying of unstructured text using graph analysis are provided. Some embodiments apply machine learning to the analysis of unstructured text to identify regulatory, privacy, and cybersecurity risks. In some embodiments, a query string is provided to identify desired content in the unstructured text. The query string is tokenized and the tokenized parts are converted into nodes of a query graph and relationships are defining between the nodes. After identifying matches between terms in target text with nodes of the query graph, a graph is generated using matched terms as nodes. Based on the defined relationships, a determination is made whether any group of nodes on the graph satisfy the query string. Any matched nodes are mapped to the target text, and this information is provided to an analyst or reviewer for further consideration or action.

22 Claims, 8 Drawing Sheets

FIG. 1

I don't know how you've worked with previous companies, but we're focused on getting the results you need at the time you need them, it's a feature. We have a long, decorated history of financial leadership and success, starting with my grandfather, who passed away twenty years ago today. Having said that, we never forget that fewer results cannot be predicted by past performance. I can tell you many stories about my grandfather, but that is certainly something he believed in, bringing about financial benefits.

I don't know how you've worked with previous companies, but we're focused on getting the results you need at the time you need them, it's a feature. We have a long, decorated history of financial leadership and success, starting with my grandfather, who passed away twenty years ago today. Having said that, we never forget that fewer results cannot be predicted by past performance. I can tell you many stories about my grandfather, but that is certainly something he believed in, bringing about financial benefits.

SYSTEM AND METHOD FOR QUERYING OF UNSTRUCTURED TEXT USING GRAPH ANALYSIS

CROSS-REFERENCE TO RELATED APPLICATION(S)

This application claims a benefit of priority under 35 U.S.C. § 119(e) from U.S. Provisional Application No. 63/134,669, filed Jan. 7, 2021, entitled "SYSTEM AND METHOD FOR QUERYING OF UNSTRUCTURED TEXT USING GRAPH ANALYSIS," which is fully incorporated by reference herein for all purposes.

TECHNICAL FIELD

The embodiments described herein relate generally to the field of computer-based text analysis. More particularly, this disclosure relates to applying machine learning to the analysis of unstructured text to identify items in the text. Even more specifically, this disclosure relates to applying machine learning to the analysis of unstructured text to identify items such as corporate, business, and industry risks such as regulatory, privacy, and cybersecurity risks.

BACKGROUND

There is a need in the field of computer-based text analysis for systems with the ability to analyze information from electronic communications systems like video conferencing, collaboration, voice recording, chat, and email to determine whether the information shown, shared, or spoken contains information relating to items such as items relating to corporate or business (e.g., regulatory, privacy, or cybersecurity risks). In particular, the following disclosure facilitates the identification of risk where the communications content includes transcription errors, OCR errors, spelling variations, synonyms typos, or other irregularities. The flexible querying method of the invention permits detection of relevant language despite errors and irregularities in the text.

Prior art solutions have attempted to solve this problem, but are inadequate due to various factors. Prior art solutions that use exact term matching miss too many detections. Solutions using exact matching of terms miss matches because of the "fuzziness" in both the query text and the result text. Furthermore, a query can have multiple phrases with similar meanings and the returned text—the results—may not be correct because of an inability to exactly match search terms. For example, a search for "guarantee" may not return "guaran1ee" because of a mis-transcribed letter "t".

Other prior art tools use regular expressions in an attempt to solve the problem. However, the limitations of regular expressions render such solutions inadequate. Regular expressions are only useful for parsing certain types of text strings and have limited applicability for analysis of less structured content. In addition, regular expression-based models lack flexibility and ease of implementation due to the complexity of debugging efforts.

SUMMARY

The present disclosure describes techniques used in systems, methods, and computer program products that embody computerized techniques for identifying items in unstructured text. A method of identifying items in unstructured text includes providing a query string relating to items to be identified in target text of the one or more content sources, defining relationships between terms in the query string, identifying matches between terms in the query string and terms in the target text, generating a graph having nodes corresponding to the identified matches between terms in the query string and terms in the target text, based on the defined relationships between terms in the query string, determining that a group of nodes of the generated graph match the query string, and mapping text in the unstructured text corresponding to the determined match to identify a portion of the unstructured text that meets requirements of the query string.

According to one embodiment, a method of identifying items in unstructured text includes providing a query string relating to items to be identified in target text of the one or more content sources, defining relationships between terms in the query string, identifying matches between terms in the query string and terms in the target text, generating a graph having nodes corresponding to the identified matches between terms in the query string and terms in the target text, based on the defined relationships between terms in the query string, determining that a group of nodes of the generated graph match the query string, and mapping text in the unstructured text corresponding to the determined match to identify a portion of the unstructured text that meets requirements of the query string.

According to one embodiment, the relationships between the terms in the query string can be learned by applying machine learning methods trained on queries and targets.

According to one embodiment, a computer program product comprising a non-transitory computer readable medium storing instructions translatable by a processor, the instructions when translated by the processor perform, in an enterprise computing network environment steps discussed above.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, the present disclosure describes systems and methods for enhanced rule-based querying of unstructured text using graph analysis. One embodiment of the invention relates to applying machine learning to the analysis of unstructured text to identify regulatory, privacy, and cybersecurity risks. Of course, the techniques disclosed herein may be used for other applications or to identify other types of items, as one skilled in the art would understand. For clarity, the disclosure will be described in the context of using a query string to identify content in target text relating to risks such as regulatory, privacy, and cybersecurity risks. For example, an organization may want to determine that a textual information, or other content, is compliant with desired policies or rules. As an example, an organization may want to know if content displayed during a collaboration screen share contains a disclaimer stating (or an equivalent) something like "past performance does not imply future rewards." As discussed in the following paragraph, content can originate from many data sources, including content originating from a visual source. Also note that the examples following relate to a single query string. In a typical application, numerous different query strings may be used to identify items in any given target text.

Text or content can come from many data sources, for example, video and audio transcripts, optical character recognition (OCR), text from chat, content from collaboration platforms (e.g., Zoom, Teams and Webex, etc.), file transfers, whiteboards, webcam content, audio and video conference platforms, fax, and other electronic communications. The techniques described below can identify types of content (e.g., certain text, phrases, ideas, disclaimers, proprietary or private content, profanity, etc.) in the data sources. The identified content can be provided to a reviewer, for example, for further consideration. Therefore, a reviewer can analyze large volumes of content and accurately determine where a risk might exist. Moreover, the techniques described below provide a reviewer transparency into every aspect of a communication, including video, voice, chat, etc.

The invention (which may be implemented entirely in software) uses graph theory in conjunction with enhanced rule-based matching to analyze a string of text to determine if it contains content that would be relevant to a given search query. Some embodiments can integrate machine learning to update the graph. Specifically, embodiments examine ingested content such as text from video and audio transcripts and OCR as well as text from chat, fax, and other electronic communications to determine if that data contains regulatory, privacy, or cybersecurity risks.

Through this invention, matching queries can be written in a way that is fast and flexible, allowing the developer to represent more powerful queries and match them. The benefits of this approach allow for nuanced and accurate searching even in cases where the both the query and target texts are noisy.

Figure 1:
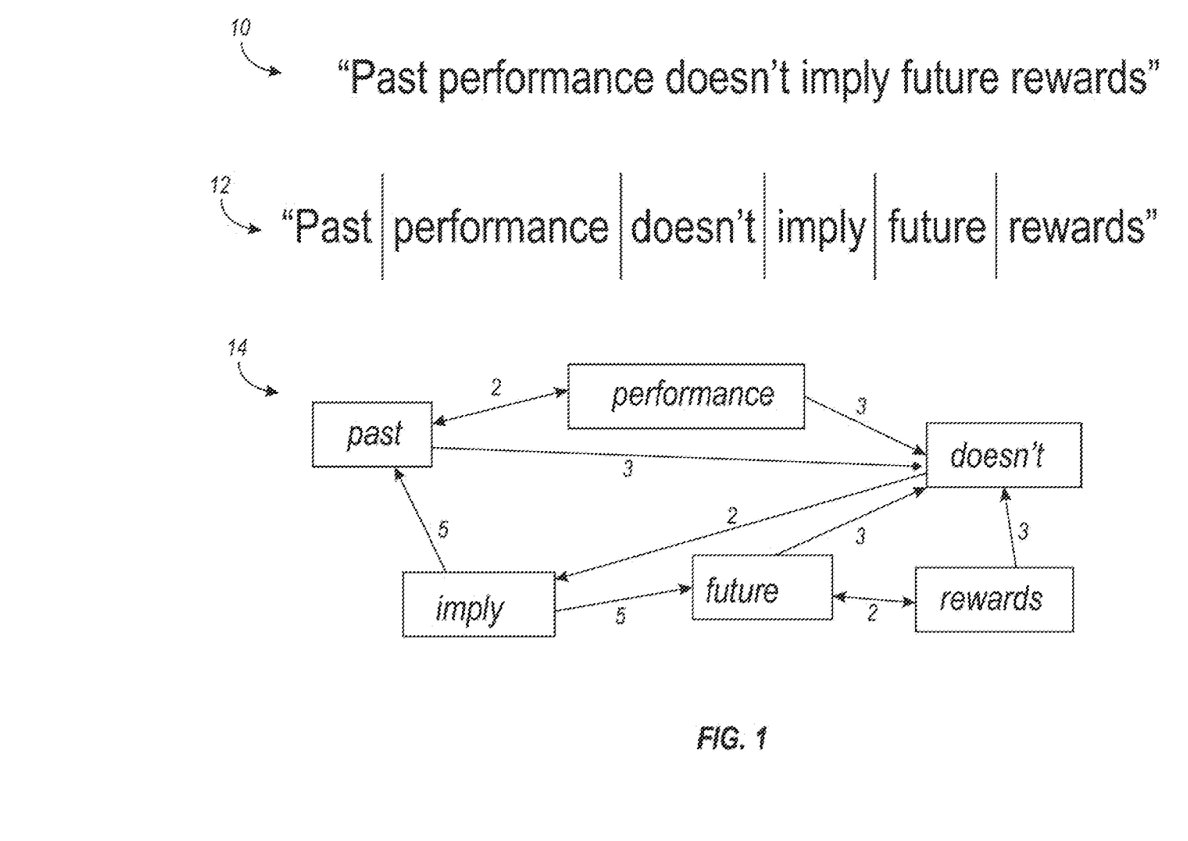
FIG. 1 is a diagram illustrating a query string and a resulting query graph.

FIG. 1 is a diagram of a query string and a resulting query graph (described below). In this example, a query string 10 is "Past performance doesn't imply future rewards." In this example, the query string 10 is intended to be used to identify disclaimer language in target text that relates to the query string 10. A first step in generating a query graph is to split the query text into parts. The text parts can be overlapping or not, whole words or not, and can have varying lengths. In the example of FIG. 1, the query string 10 has been split into parts, and shown as query string 12. In the example of FIG. 1, the whole words are non overlapping. In some embodiments, the query strings can be split using other standard tokenization techniques, as one skilled in the art would understand.

Initialization with constraints define the relationships between the parts of the query string. For example, constraints can define if certain terms must appear within a certain distance of each other, or if the terms must appear in a particular order. For example, constraints can require that the word "guarantee" must be found within 5 text parts of "returns," or "guarantee" must always be found before "returns." As more data is collected, machine learning can be used to iteratively enhance existing relationships. This may comprise modifying existing constraints, adding new constraints, and adding a "strength" or confidence value based on a numeric score, for example.

Therefore, after spitting the query string 10 into parts (query string 12), each part is converted into a node in a query graph 14. In the query graph 14 shown in FIG. 1, weighted, directional edges (represented by the lines and arrows connecting different nodes) are added between the nodes. In this example, the bidirectional arrow between the "past" and "performance" nodes implies that the query is flexible and will register a successful match for either "past performance" or "performance of the past". The weight "2" of this edge implies that we allow, at most, two words between "past" and "performance" (e.g., performance of the past). Similarly, the weight of "2" of the bidirectional edge between the "future" and "rewards" nodes implies that we allow at most two words between "future" and "rewards". Also, note that some of the directional edges in the query graph 14 are bidirectional, while others are not bidirectional (e.g., the directional edge between "performance" and "doesn't". The weights can be manually determined or learned by a machine learning system, as desired. Also note that, while the query graph 14 displays a weight between nodes relating to words between terms, a strength number or other values representing relationships between terms or groups of terms could also be indicated in this value. In addition, the weights and values can change over time based on machine learning techniques, until optimum values are determined.

For each part of the query string, the invention looks for fuzzy matches in the target text. "Fuzzy matching" is intended to refer to matches that include non-exact matches, as discussed below, and as one skilled in the art would understand. Other embodiments can include strings that have similar semantic meaning to the part (e.g., "I think therefore I am" and "I ponder therefore I am") as well as strings that, when visually rendered, have a similar look to the visually rendered part, and strings that have a small edit distance to the part. As above, facilitating a fuzzy match for "guaran1ee" for "guarantee" or matching on "re tur ns" for "returns," etc. may be used.

Figure 2:
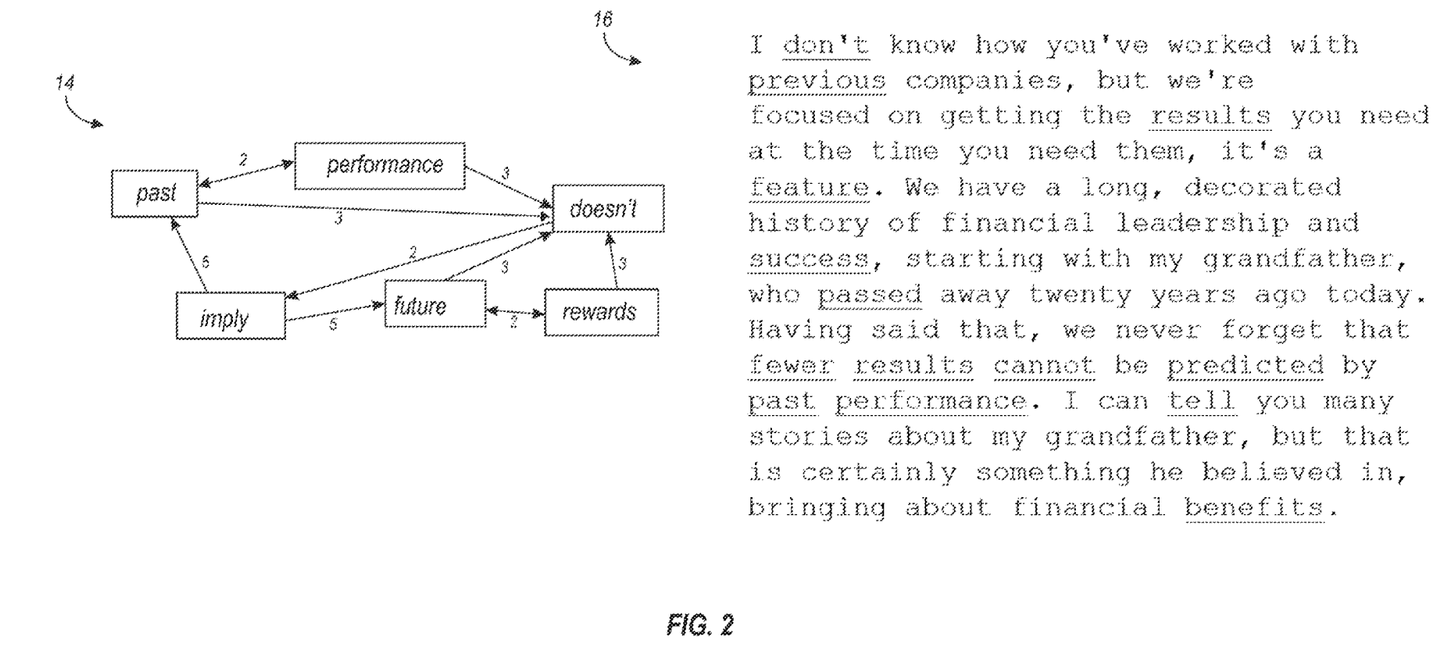
FIG. 2 shows the query graph of FIG. 1 and target text.

FIG. 2 shows the query graph 14 of FIG. 1, and exemplary target text 16. Target text 16 can be ingested and text captured from any text source, as described above. In this example, the invention is used to identify language in the target text that is considered to be a match with a query string, such as query string 10 of FIG. 1. With respect to the exemplary query string 10 of FIG. 1, the invention analyzes the target text 16 to find a match with disclaimer language corresponding to the query string 10. In the example of FIG. 2, the target text 16 is:

"I don't know how you've worked with previous companies, but we're focused on getting the results you need at the time you need them, it's a feature. We have a long, decorated history of financial leadership and success, starting with my grandfather, who passed away twenty years ago today. Having said that, we never forget that fewer results cannot be predicted by past performance. I can tell you many stories about my grandfather, but that is certainly something he believed in, bringing about financial benefits."

As mentioned above, for each part of the query string, the invention looks for fuzzy matches in the target text. In this example, each query node of the query graph 14 is matched to the target text 16. In this example, query node "past" is matched to "past", and also to "previous" (synonym), and "passed" (sound-alike) of target text 16. Query node "performance" is matched to "performance", and also to "results" and "success" (similar or related) of target text 16. Query node "doesn't" is matched to "don't" and "cannot" (similar) of target text 16. Query node "imply" is matched to "Predicted" and "tell" (similar, synonyms) of target text 16. Query node "future" is matched to "feature" and "fewer" (sound-alikes) of target text 16. Query node "rewards" is matched to "results" and "benefits" (similar, synonym) of target text 16. In FIG. 2, each of the matched words in the target text 16 is shown as underlined text. The matching of query terms to terms in the target text 16 can be accomplished using any desired matching techniques, such as using open source libraries, lexicons, and existing resources, creating matching resources, data mining techniques, etc., as one skilled in the art would understand.

Figure 3:
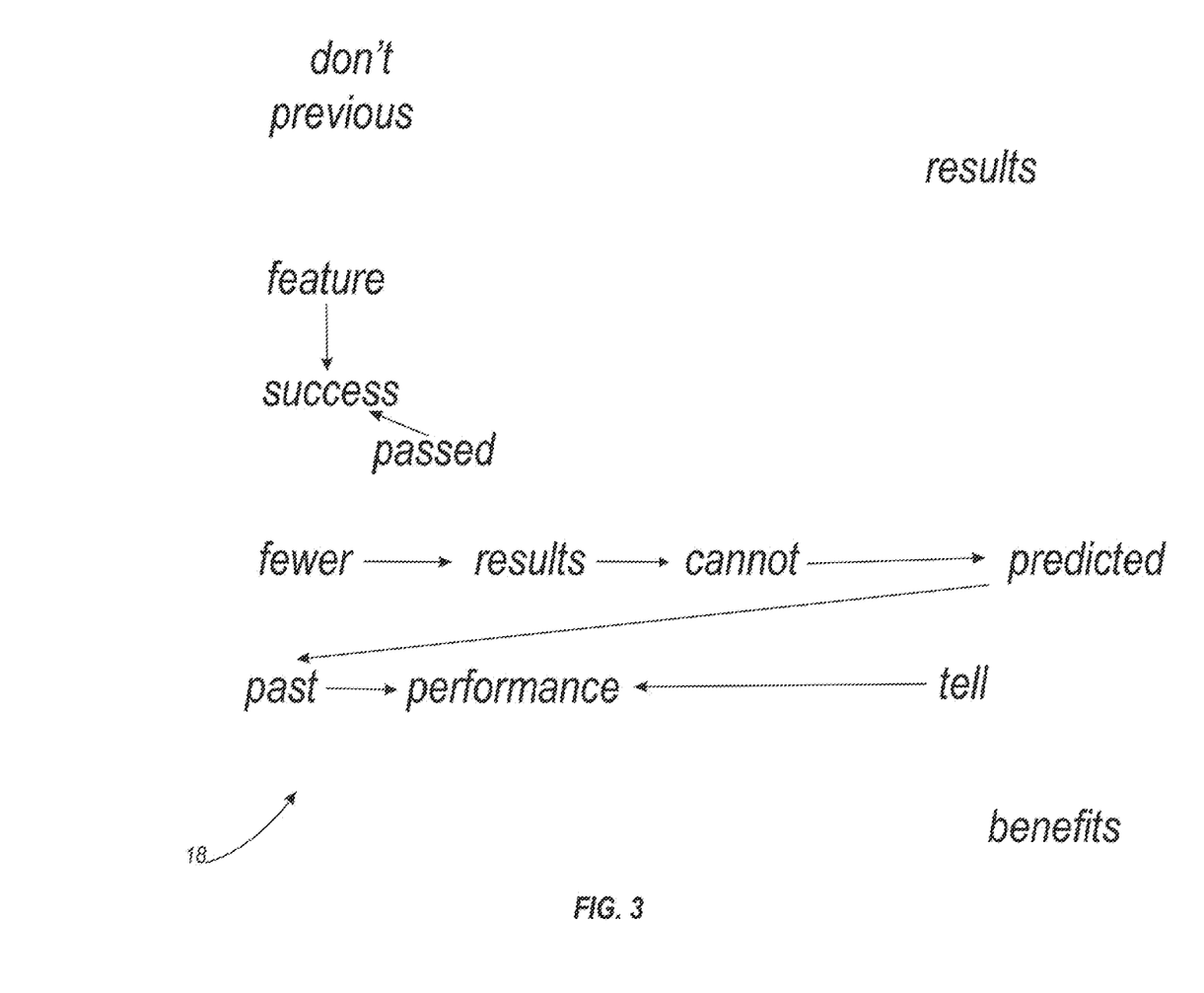
FIG. 3 shows a graph representing the matches found in the target text.

Next, edges are provided between matches if they are close enough (in the target text) and are in the correct order as defined in the query graph 14. FIG. 3 shows a graph representing the matches found in the target text 16 of FIG. 2. The matches shown in FIG. 3 are shown as underlined text in the target text 16 in FIG. 2. After finding fuzzy matches, a graph 18 is generated where the nodes of the graph are the putative fuzzy matches to the parts found in the previous step, each labeled with the part it corresponds to. An edge between two nodes will be present if their respective locations in the target text satisfies the relationships defined in the rules (query graph 14). The edges can be directed or undirected, depending on the relationships. In the example graph 18 shown in FIG. 3 (and referring to the target text 16), "fewer" (which matched with "future" in the query graph 14) was found within three words of "results" (which matched with "rewards" in the query graph 14). Therefore, "fewer" and "results" are shown as nodes in the graph 18, with an edge drawn between them. Other nodes and edges are shown in the same manner. While the words "benefits", "don't", "previous", and "results" matched to words in the query graph 14, none of these words satisfied the requirements of the query graph 14 with respect to their proximity to other matched words, as defined by the rules represented by the query graph 14.

Next, each connected component (as shown in FIG. 3) is evaluated to make sure the number of members exceeds a given threshold. The threshold can also be learned using machine learning techniques. Each such connected component may be considered to be a match. In some embodiments, a "match" may encompass scales of matches, such as "strongly connected components," etc. The connected components of the graph can be identified using a known graph theory algorithm. In other embodiments, connected components can be determined using other techniques and other graph structures, as one skilled in the art would understand.

In some embodiments, well known machine learning techniques can be used to run the graph-based constraint matching against a training data set and infer a strength variable and threshold for each rule, pattern, or constraint, and learn additional rules or refine the structure of additional rules using standard algorithms known to those versed in the art.

Figure 4:
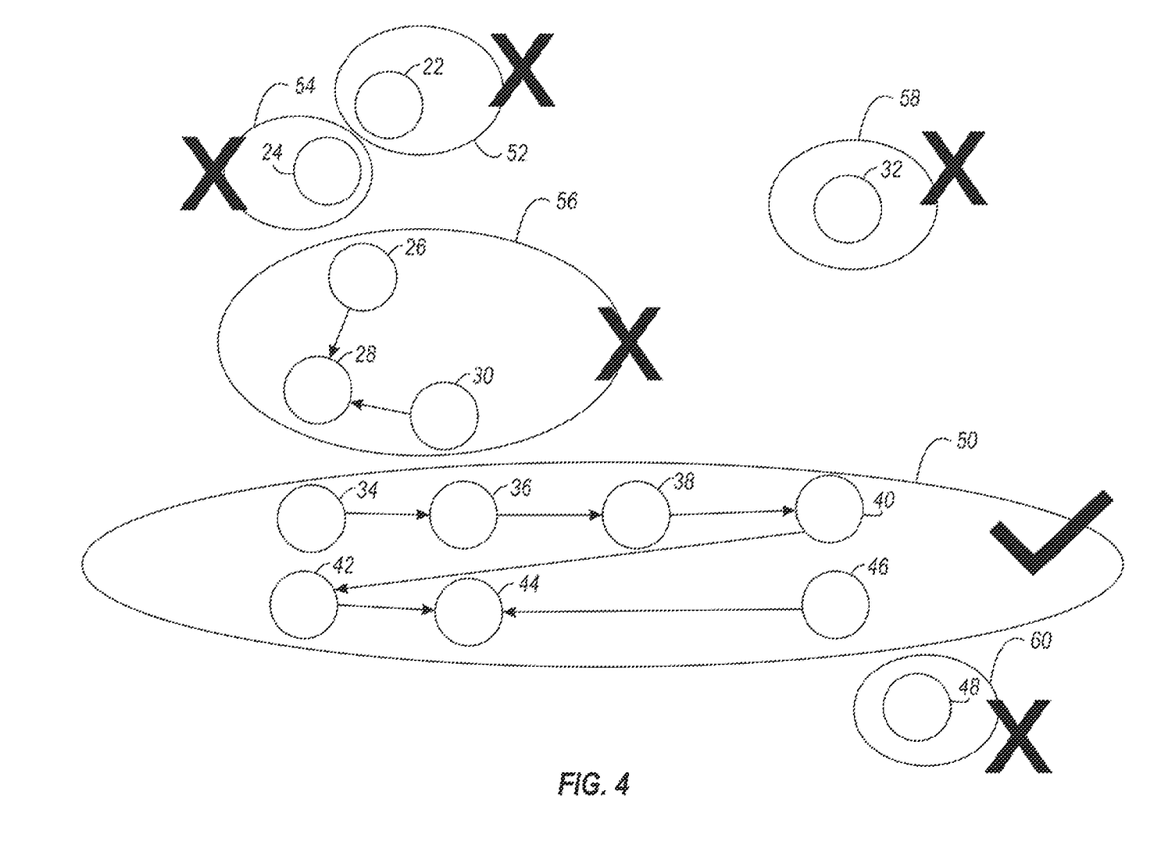
FIG. 4 is a graph illustrating the matches and edges shown in FIG. 3.

FIG. 4 is a graph illustrating several connected components (e.g., matches and edges shown in FIG. 3). Each word (match) from FIG. 3 is illustrated as a node in FIG. 4. In this example, node 22 corresponds to "don't", node 24 corresponds to "previous", node 26 corresponds to "feature", node 28 corresponds to "success", node 30 corresponds to "passed", node 32 corresponds to "results", node 34 corresponds to "fewer", node 36 corresponds to "results", node 38 corresponds to "cannot", node 40 corresponds to "predicted", node 42 corresponds to "past", node 44 corresponds to "performance", node 46 corresponds to "tell", and node 48 corresponds to "benefits." Each group of nodes (single matches or groups connected by edges) is circled in FIG. 4. Next, each connected component is examined to determine if the number and type of parts matched is higher than a predetermined threshold (e.g., high enough score, in the correct order, etc.). If so, the component represents a match to the query and can be mapped back to the target string to return its location. In FIG. 4, circled groups that are not determined to be matches to the query are shown with an "X" (groups 52, 54, 56, 58, and 60) and groups that are determined to be matches to the query are shown with a check mark (e.g., group 50).

Figure 5:
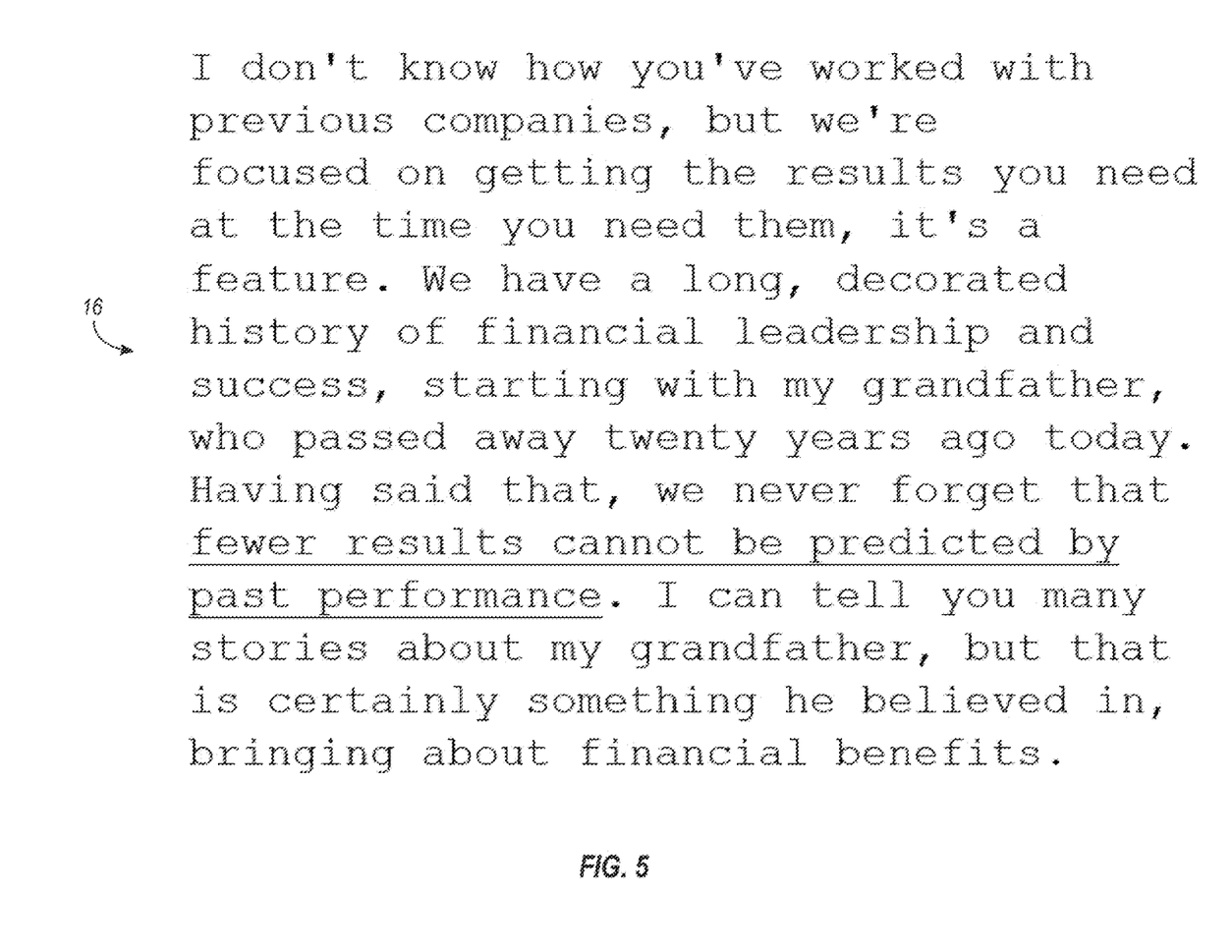
FIG. 5 shows mapped text identified in target text.

If a component represents a match to the query (group 50), it can be mapped back to the target string 16 to return its location in the target text 16 to a reviewer for further consideration. For example, a reviewer may evaluate the target text and confirm whether or not the text qualifies as a disclaimer. FIG. 5 shows the target text 16 with the mapped text ("fewer results cannot be predicted by past performance") underlined. Note that, in this example, text marked as a "match" may not mean that the text is a disclaimer, but rather that the marked text may contain a disclaimer. In some embodiments, the marked text can be provided with a confidence score that relates to the system's confidence that the marked text contains a requisite disclaimer.

Figure 6:
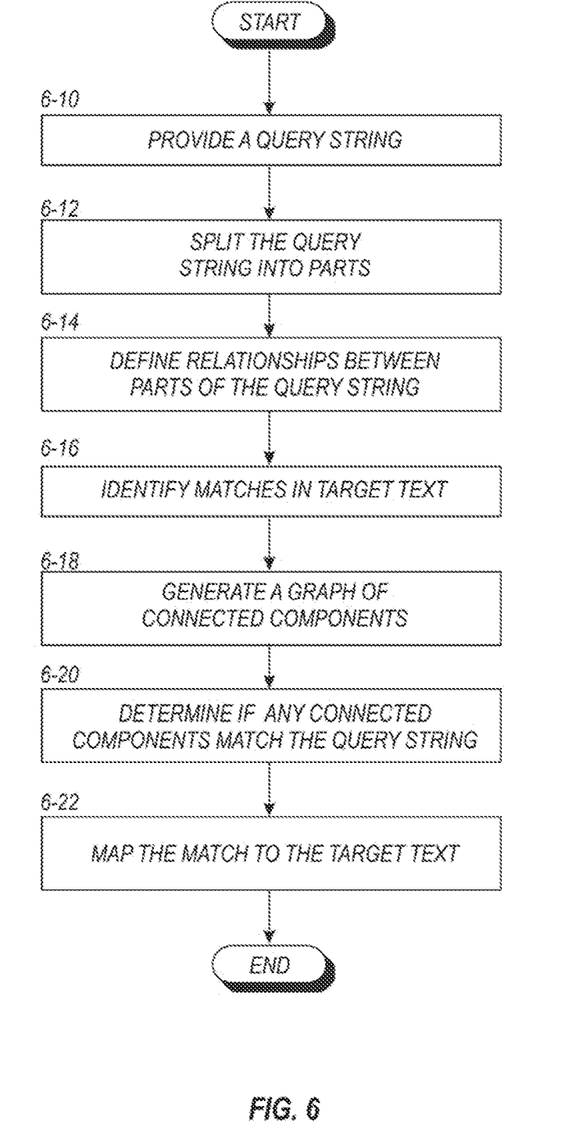
FIG. 6 is a flowchart illustrating one example of a process for the analysis of text.

FIG. 6 is a flowchart illustrating one example of a process for the analysis of text. For the purposes of this example, it is assumed that textual content (the target text) has already been gathered, as discussed above. For example, the target text can come from any desired source(s), such as video and audio transcripts, OCR, text from chat, file transfers, whiteboards, webcam content, audio and video conference platforms, fax, other electronic communications, etc.

The process of FIG. 6 starts at step 6-10, where a query string is provided. In typical applications of the invention, numerous query strings may be provided for various goals. For clarity, FIG. 6 will be described in the context of a single query string. An exemplary query string 10 was provided with respect to FIG. 1, with the goal, in that example, of identifying a disclaimer in target text. Other query strings and other goals are also possible, as one skilled in the art would understand.

At step 6-12, the query string is split (e.g., tokenized) into parts, as illustrated at reference numeral 12 of FIG. 1. At step 6-14, the parts are each converted into a node of a query graph (e.g., query graph 14 of FIG. 1). One or more rules are used to define relationships between parts (nodes of the query graph) of the query string (6-14). For example, the query graph can define a maximum distance (e.g., defined by a number of words, etc.) between various parts in the target text. If desired, weights or other values can be assigned to relationships between terms. Directional edges can be shown in a query graph (e.g., FIGS. 1, 2) with the weights.

At step 6-16, matches to the tokenized terms are identified in the target text (FIG. 2) using fuzzy matching techniques (described above). Next, a graph is generated using nodes corresponding to matches from the target text (step 6-18). As shown in FIG. 3, an edge between two nodes will be present if their respective locations in the target text satisfies the relationships defined in the rules. At step 6-20, a determination is made for each group of connected nodes in the graph (FIG. 4) whether the nodes match a predetermined threshold relating to the query string. If the threshold is reached, the matched nodes are mapped to the target text (step 6-22), identifying the portion of the target text that meets the requirements of the query string. In some embodiments, the location of the marked text is provided to an analyst or reviewer for further consideration or action. As a result, the reviewer can evaluate the identified content, without having to review all of the content, conduct manual text searches, etc. In the example of identifying a disclaimer (or an equivalent) of "past performance does not imply future rewards," the reviewer can analyze the identified text ("fewer results cannot be predicted by past performance") to determine if the identified text satisfies the query and warrants further consideration or action. Action may include screening the text, providing context or disclaimers, etc. In the example of identifying private or confidential information, actions may include redacting the private or confidential content, tagging the content for further consideration, etc. In the example of identifying cyber security issues, action may include screening the identified text, adjusting permissions for accessing the content, etc. Other actions may include implementing actions to help prevent future similar disclosures or issues.

Figure 7:
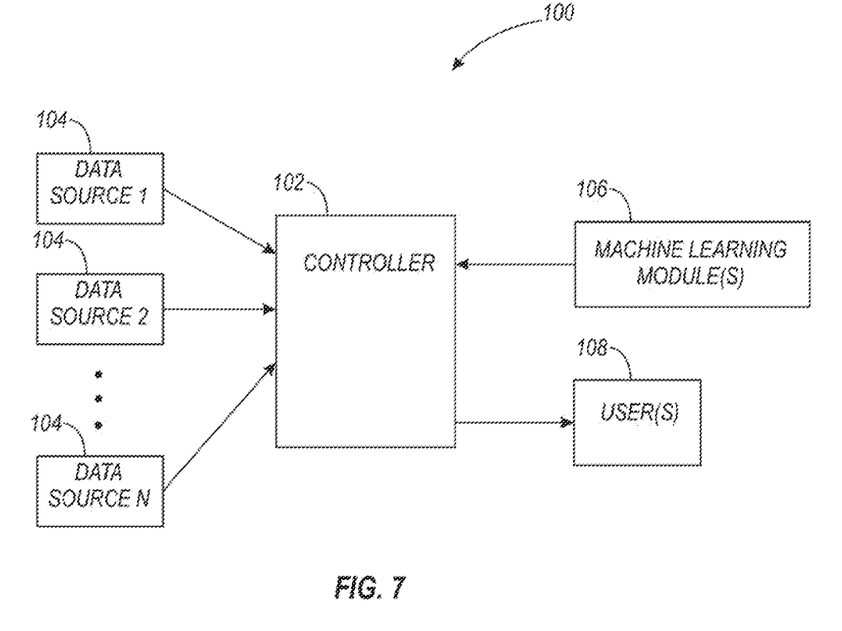
FIG. 7 is a diagrammatic representation of one embodiment of an architecture for analyzing unstructured text.

FIG. 7 is a diagrammatic representation of one embodiment of a simplified architecture 100 for analyzing unstructured text. In the embodiment illustrated, architecture 100 includes a central controller 102, which may be comprised of any desired computing device including a computer, a server, etc. FIG. 7 shows a plurality of data sources 104 (1 through N) that can provide data to the controller 102. The data sources 14 can represent any desired sources, for example, data sources corresponding to the data sources described above (e.g., video and audio transcripts, OCR, text from chat, file transfers, whiteboards, webcam content, audio and video conference platforms, fax, and other electronic communications). FIG. 7 shows machine learning module(s) 106 that can be trained to perform the various machine learning functions described above, for example, for determining matches of a query string to component graph (FIG. 4). FIG. 7 also shows one or more users 108 that may be involved with the system. For example, as described above, an analyst may be provided with matches to query strings in target text.

Figure 8:
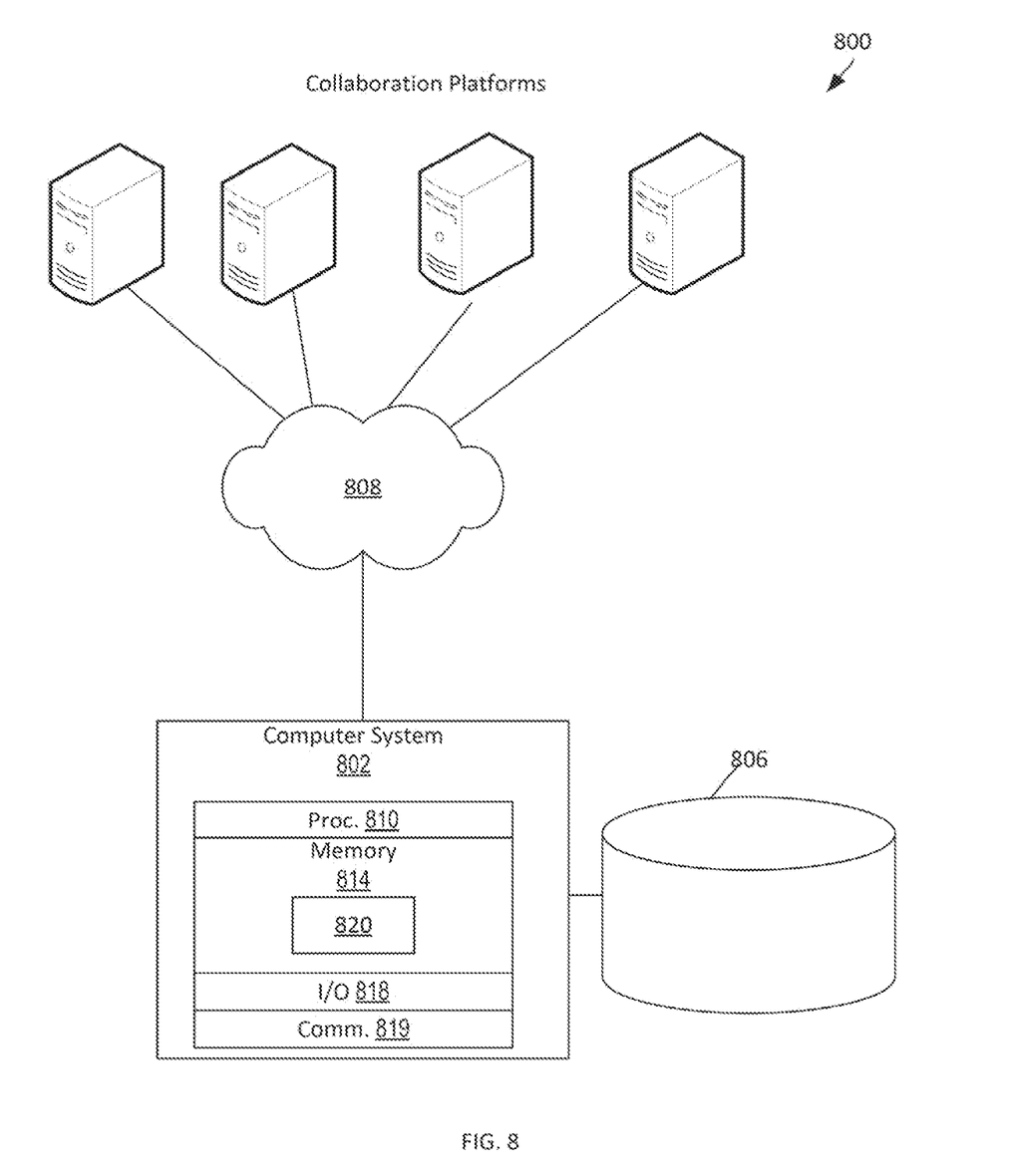
FIG. 8 is a diagrammatic representation of one embodiment of a network environment.

FIG. 8 is a diagrammatic representation of one embodiment of a system for monitoring and analyzing unstructured text across heterogeneous collaboration platforms. The system may comprise one or more computer systems with central processing units executing instructions embodied on one or more computer-readable media where the instructions are configured to perform at least some of the functionality associated with embodiments of the present invention. In the illustrated embodiment, system 800 includes a computer system 802 having a computer processor 810 and associated memory 814. Computer processor 810 may be an integrated circuit for processing instructions. For example, computer processor 810 may comprise one or more cores or microcores of a processor. Memory 814 may include volatile memory, non-volatile memory, semi-volatile memory or a combination thereof. Memory 814, for example, may include RAM, ROM, flash memory, a hard disk drive, a solid-state drive, an optical storage medium (e.g., CD-ROM), or other computer-readable memory or combination thereof. Memory 814 may implement a storage hierarchy that includes cache memory, primary memory or secondary memory. In some embodiments, memory 814 may include storage space on a data storage array. Computer system 802 may also include input/output ("I/O") devices 818, such as a keyboard, monitor, printer, electronic pointing device (e.g., mouse, trackball, stylus, etc.), or the like. Computer system 802 may also include a communication interface 819, such as a network interface card, to interface with network 808, which may be a local LAN, a WAN such as the Internet, mobile network, or other type of network or combination thereof. Network 808 may represent a combination of wired and wireless networks that may be utilized for various types of network communications.

Memory 814 may store instructions executable by computer processor 810. For example, memory 814 may include code executable to provide an interface, such as an API or other interface to interface with heterogeneous online collaboration systems. According to one embodiment, memory 814 may include code 820 executable to provide a computer system, for example, a data security platform. Data store 806, which may be part of or separate from memory 814, may comprise one or more database systems, file store systems, or other systems to store various data used by computer system 802.

Each of the computers in FIG. 8 may have more than one CPU, ROM, RAM, HD, I/O, or other hardware components. Portions of the methods described herein may be implemented in suitable software code that may reside within memory 814 or other computer-readable memory.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys a relationship between the fields. However, any suitable mechanism may be used to establish a relationship between information in fields of a data structure, including through the use of pointers, tags or other mechanisms that establish a relationship between data elements.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

What is claimed is:

1. A system for identifying items in unstructured text, the system comprising:
    a memory storing unstructured text ingested from one or more content sources;
    a processor; and
    a non-transitory computer readable medium storing instructions translatable by the processor, the instructions when translated by the processor perform:
        providing a plurality of predetermined query strings, each of the predetermined query strings relating to concepts to be identified in target text of the one or more content sources;
        defining relationships between different terms included in a first query string of the plurality of query strings;
        identifying matches between terms in the first query string and terms in the target text;
        generating a graph having nodes corresponding to the identified matches between terms in the first query string and terms in the target text;
        based on the defined relationships between terms in the first query string, determining that a group of nodes of the generated graph match the first query string; and
        mapping text in the target text corresponding to the determined match to identify a portion of the target text that meets requirements of the first query string.

2. The system of claim 1, wherein the one or more content sources include transcripts from collaboration platform communications.

3. The system of claim 1, wherein the target text includes transcripts generated from audio or video communications.

4. The system of claim 1, further comprising tokenizing the first query string, wherein the relationships are defined between tokenized terms of the first query string.

5. The system of claim 4, wherein defining relationships between terms in the first query string further comprises generating a query graph having nodes corresponding to the tokenized terms.

6. The system of claim 5, wherein defining relationships between terms in the first query string further comprises defining maximum distances between terms in the target text.

7. The system of claim 6, wherein determining that a group of nodes of the generated graph match the first query string includes determining that the group of nodes satisfies the defined maximum distances between terms in the target text.

8. The system of claim 1, further comprising providing the identified portion of the target text to a reviewer for further evaluation.

9. The system of claim 8, further comprising taking an action in response to the further evaluation of the identified portion of the target text.

10. A method of identifying items in unstructured text, the method comprising:
providing a plurality of predetermined query strings, each of the predetermined query strings relating to concepts to be identified in target text of the one or more content sources;
defining relationships between different terms included in a first query string of the plurality of query strings;
identifying matches between terms in the first query string and terms in the target text;
generating a graph having nodes corresponding to the identified matches between terms in the first query string and terms in the target text;
based on the defined relationships between terms in the first query string, determining that a group of nodes of the generated graph match the first query string; and
mapping text in the target text corresponding to the determined match to identify a portion of the target text that meets requirements of the first query string.

11. The method of claim 10, wherein the one or more content sources include transcripts from collaboration platform communications.

12. The method of claim 10, further comprising tokenizing the first query string, wherein the relationships are defined between tokenized terms of the first query string.

13. The method of claim 12, wherein defining relationships between terms in the first query string further comprises generating a query graph having nodes corresponding to the tokenized terms.

14. The method of claim 13, wherein defining relationships between terms in the first query string further comprises defining maximum distances between terms in the target text.

15. The method of claim 14, wherein determining that a group of nodes of the generated graph match the first query string includes determining that the group of nodes satisfies the defined maximum distances between terms in the target text.

16. The method of claim 10, further comprising providing the identified portion of the target text to a reviewer for further evaluation.

17. A computer program product comprising a non-transitory computer readable medium storing instructions translatable by a processor, the instructions when translated by the processor perform, in an enterprise computing network environment:
providing a plurality of predetermined query strings, each of the predetermined query strings relating to concepts to be identified in target text of the one or more content sources;
defining relationships between different terms included in a first query string of the plurality of query strings;
identifying matches between terms in the first query string and terms in the target text;
generating a graph having nodes corresponding to the identified matches between terms in the first query string and terms in the target text;
based on the defined relationships between terms in the first query string, determining that a group of nodes of the generated graph match the first query string; and
mapping text in the target text corresponding to the determined match to identify a portion of the target text that meets requirements of the first query string.

18. The computer program product of claim 17, further comprising tokenizing the first query string, wherein the relationships are defined between tokenized terms of the first query string.

19. The computer program product of claim 18, wherein defining relationships between terms in the first query string further comprises generating a query graph having nodes corresponding to the tokenized terms and defining maximum distances between terms in the target text.

20. The computer program product of claim 19, wherein determining that a group of nodes of the generated graph match the first query string includes determining that the group of nodes satisfies the defined maximum distances between terms in the target text.

21. The method of claim 10, wherein the one or more content sources include video transcripts.

22. The method of claim 10, wherein the one or more content sources include audio transcripts.

* * * * *